Sept. 18, 1923.
W. B. LASKEY
1,468,535
DIE FOR MAKING POROUS CANDIES
Filed Feb. 3, 1921
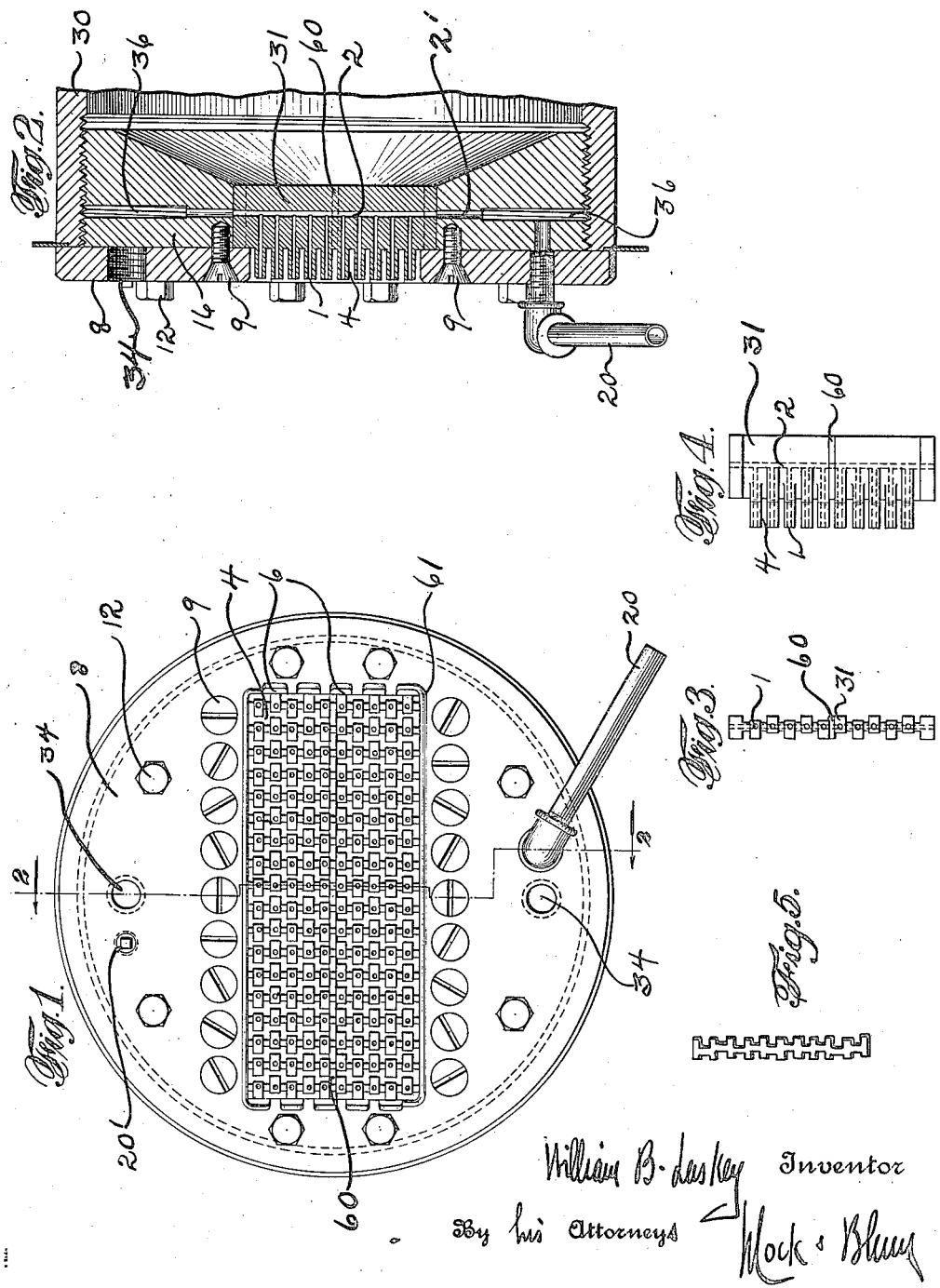

Patented Sept. 18, 1923.

1,468,535

UNITED STATES PATENT OFFICE.

WILLIAM B. LASKEY, OF MARBLEHEAD, MASSACHUSETTS, ASSIGNOR, BY MESNE ASSIGNMENTS, TO THE CHOCOLATE SPONGE CO., INC., OF BROOKLYN, NEW YORK, A CORPORATION OF NEW YORK.

DIE FOR MAKING POROUS CANDIES.

Application filed February 3, 1921. Serial No. 442,052.

*To all whom it may concern:*

Be it known that I, WILLIAM B. LASKEY, a citizen of the United States, residing at Marblehead, in the county of Essex and State of Massachusetts, have invented certain new and useful Improvements in a Die for Making Porous Candies, of which the following is a specification.

My invention relates to a new and improved die for making porous candies.

Such a die or device has been described in my former U. S. Patent No. 1,107,325, issued August 18th, 1914.

My invention particularly relates to the manufacture of a porous filling for that type of candy which consists of a porous filling covered with a coating of chocolate.

It has been hitherto been difficult to make a uniform quality of such porous candy or filling under various weather conditions, as the character of this filling and the ease of making it are greatly influenced by the amount of moisture in the air.

According to my invention, the porosity of the filling is maintained during the manufacture thereof, by means of currents of air.

Another object of my invention is to have these currents of air continuously flowing through the holes of the hot plastic mixture from which the filling is made, so as to cool it and prevent the walls of the said holes from collapsing inwardly, so as to destroy the porosity of the candy.

Other objects of my invention will be described in the following specification and drawings which illustrate a preferred embodiment of the device which is used to carry out my invention.

Figure 1 is a front view.

Figure 2 is a section along the line 2—2 of Figure 3.

Figure 3 is a front view of a partition member.

Figure 4 is a vertical section through the center of Figure 3 and also illustrates other details.

Figure 5 shows one of the extruded streams of candy.

My invention is carried out by means of an improved die having a series of passages through which the hot plastic candy is extruded under considerable pressure.

The charge of filling is contained in a cylinder 30 having a front which has an interior threading. The general construction of the cylinder may be shown in my former U. S. Patent No. 1,107,325.

The cylinder 30 has a front plate 8 having an opening in the center thereof for the partition members of the die which consist, as shown in Figure 3, of a series of members 31 having base portions said members being connected to the holder plate 16 in any suitable manner such as by soldering or the like.

Vertical passages 4 having side branches are thus formed between the partition members of the device and passages 6 are formed in the front plate 8 for a purpose which will later be described. The candy is thus forced through the extrusion means in a series of streams each stream consisting of a series of wide bars of equal width and arranged one above the other, and connected by a series of intermediate narrow bars arranged zig-zag with respect to the common central vertical line of said wide bars. Of course, it would make no difference if said wide bars were at any angle to the horizontal.

As will be noted, the passages 6 are adjacent alternate parts or elements of the end partition members. As can be seen in Figures 3 and 4, the partition members 31 have perforations 1 and 2 which extend through them as shown in Fig. 4 and which serve for the passage of air currents later to be described. The front plate 8 and the holder 16 are connected by a series of screws 9 whose heads are flush with the front surface of the front plate 8.

They are also secured by strong bolts 12 and the front plate 8 is further provided with perforations 34 into which pins may be thrust, so that these pins can be used to revolve the die to remove it from the end of the cylinder 30 whenever this is desired. Air chambers 36 are formed at the opposite ends of a diameter of the holder 16 by slotting the periphery of said holder 16, so that each chamber 36 has a cross-section along said diameter which is a segment of a circle. An air supply pipe 20 serves to lead air under pressure from any suitable source not shown in the drawings and the die is so inserted into the cylinder, that when the parts are in the position shown in Figure 1 with the lines of screws 9 substantially horizontal, the air pipe 20 communicates with one of the chambers 36 as shown in Figure 2, through one of the taps 20'.

The rears of the air holes 1 communicate with the air chambers 36 by means of the vertical channels 2 and cooperating channels 2' bored into the holder 16, and communicating with chambers 36, so that the air currents which enter through pipe 20 are separated and pass out of chambers 36 along the channels 2' and 2 to channels 1 and issue out therefrom.

The method of making the porous filling is as follows:—

A charge of hot plastic filling is kept in the cylinder 30, the filling being kept hot and plastic by any suitable source of heat, such as is shown in my former U. S. Patent No. 1,264,533.

The cylinder 30 has pressure means therein such as a piston shown in my said former U. S. Patent No. 1,264,533. The hot plastic candy is therefore forced against the partition members with great force and pressure and it flows out through the passages 4 and 6.

At the same time, air is forced through the pipe 20 and issues out of the air holes 1.

The separated streams of hot plastic filling which are extruded through the passages 4 and 6 coalesce because of their zigzag shape, especially when they are pulled, so as to form a filling having a series of regularly arranged holes corresponding to the several parts 31 through which air currents are passed to quickly cool and harden the candy filling and to prevent the walls of the holes from collapsing. The plate 8 is also provided with a rounded flange 61 which serves to confine the mass of extruded candy, to give it a smooth contour, and to cause the streams of extruded candy to coalesce. The members 31 are braced at their central points by a support 60.

The candy is not cooled so powerfully so as to make it lose its plasticity, as it must be pulled by hand or by any suitable means when it passes a suitable distance beyond the plate 8 so as to diminish the cross-section of the tube of candy and cause the stick of filling to be lengthened.

This die produces candy having a series of holes of substantially uniform size and uniform arrangement.

I have described a preferred embodiment of my invention, but numerous changes and omissions may be made without departing from the spirit of my invention.

I claim:—

1. In a die mechanism for making porous candies, the combination of a cylinder, a holder fitting substantially tightly within the said cylinder and having means held therein for dividing a mass of material forced through said cylinder into a series of streams and a holding plate overlapping the outside of said holder and secured to the said holder and the said cylinder.

2. In combination, a holder adapted to fit into a receptacle through which a mass of candy may be forced, dividing means held by said holder, said dividing means causing a mass of candy which is forced therethrough to be divided into a number of separated streams, means for enabling a current of air to be forced through the said holder substantially at right angles to the axis thereof, and additional means for enabling the said current of air to be then forced between the said streams of candy, so as to cool and harden the same and to prevent the said streams of candy from coalescing save at certain desired points.

3. In combination, a holder adapted to fit within a receptacle through which a mass of candy can be forced, dividing means held by said holder for causing the said mass of candy to be divided into a number of separated streams, passages arranged in the said holder and at an angle to the axis thereof, means for connecting said passages to a source of air under pressure, and additional passages substantially parallel to the axis of the said holder and communicating with the first-mentioned passages, whereby air is caused to pass between the said streams of candy so as to cool and harden the same.

4. In a die for making porous candies, extrusion means of such structure that the candy forced therethrough issues therefrom in a series of separated streams having side extensions and means for simultaneously forcing air between said streams.

5. In a die for making porous candies, extrusion means of such structure that the candy forced therethrough issues therefrom in a series of streams, each said stream consisting of a series of members separated by a second series of members of less width, so that adjacent members of each said stream are of varying width and means for forcing air through said extrusion means intermediate said streams, said air being so forced through intermediate those members which are of less width, so that adjacent streams may be caused to coalesce only along adjacent portions of greater width.

6. In a die for making porous candies, extrusion means of such structure that the candy forced therethrough issues therefrom in a series of separated streams, said means having additional means located at the marginal parts of said streams adapted to prevent the said streams from spreading out.

7. In a die for making porous candies, a holder, a series of separated partition members held in said holder, each said partition member having a hole located at an angle to the axis of said holder, each said partition member also having a series of holes passing through it to the said first-mentioned hole.

8. In a die for making porous candies, a holder, a series of partition members, said members having a series of holes located substantially along the central line thereof, and having lateral elements extending alternately from said line.

9. In a die for making porous candies, a holder, a series of partition members, said members having a series of holes located substantially along the central line thereof, and having lateral elements extending alternately from said central line, the lateral elements of said partition members located in corresponding parts of said die extending in the same lateral direction from their respective central lines.

10. In a die for making porous candies, a holder having a plurality of segmental peripheral slots arranged substantially perpendicular to the axis thereof, taps located in said holders and communicating with said slots, whereby either of said slots may be placed in communication with a source of compressed air, a series of partition members held in said holder and substantially perpendicular to the axis thereof, each said partition member having a bore extending through its base and communicating with said slots by means of a communicating bore located in said holder, the said partition members also having bores extending to their faces, and communicating with the bores passing through their bases.

11. In a die for making porous candies, a holder having a series of partition members with lateral extensions provided therein, the said extensions being arranged alternately on the central lines of said members, said extensions being located intermediate the ends of said members, and a plate surrounding said partition members and having an inner flange spaced from and adjacent the ends of said partition members so as to prevent the spreading out of the candy issuing therebetween, said plate also having openings adjacent some of the lateral extensions of said partition members.

12. In a die for making porous candies, a series of partition members having lateral extensions intermediate their ends, means for preventing candy which is forced between said partition members from moving outwardly away from the ends of said members, and means having orifices therein through which candy can be forced, said orifices being adjacent the sides of the outermost of said partition members.

13. In a die mechanism for making porous candy, means for extruding said candy in a series of separated streams, and means for simultaneously directing a current of air upon the extruded candy, to cool and harden the same, the said extrusion means being adapted to cause the extrusion of streams of candy of such thickness and in such proximity, that said streams are free to expand laterally and coalesce along portions thereof so as to form a continuous mass of candy exterior to said die.

14. In a die mechanism for making porous candy, means for extruding said candy in a series of separated streams, and means for simultaneously forcing currents of air between said streams to cool and harden said candy, the said extrusion means being adapted to cause the extrusion of streams of candy of such thickness and in such proximity, that said streams are free to expand laterally and coalesce along portions thereof so as to form a continuous mass of candy exterior to said die.

15. In a die for making porous candies, extrusion means embodying a series of separated members adapted to cause the extrusion of a series of separated streams of candy, the said streams being permitted to move freely beyond said die, the said streams being of such thickness and in such proximity that they are free to expand laterally and coalesce along portions thereof.

In testimony whereof I hereunto affix my signature.

WILLIAM B. LASKEY.